United States Patent [19]
Stich et al.

[11] Patent Number: 5,760,381
[45] Date of Patent: Jun. 2, 1998

[54] PREPAID CARD

[75] Inventors: Rebecca Stich, Chicago, Ill.; Douglas Ramsburg, Thurmont, Md.; Ginger A. Rice, Thurmont, Md.; John L. Wantz, Thurmont, Md.; Don Dalgauer, Rockaway, N.J.; Stephen R. Nassoiy, Vienna, Va.

[73] Assignee: Moore Business Forms, Inc., Grand Island, N.Y.

[21] Appl. No.: 767,543

[22] Filed: Dec. 16, 1996

[51] Int. Cl.$^6$ .............. G06K 5/00; G06K 7/00; H04M 15/00
[52] U.S. Cl. .................. 235/380; 235/486; 379/112
[58] Field of Search ............................ 379/112, 114, 379/144, 130, 91; 340/825.34, 825.31; 235/380, 382, 381, 486; 206/39; 150/145, 147; 428/40

[56] References Cited

U.S. PATENT DOCUMENTS

| | | |
|---|---|---|
| 1,106,058 | 8/1914 | Rand . |
| 1,979,917 | 11/1934 | Vaughn .................... 229/72 |
| 3,692,233 | 9/1972 | Carter et al. ............... 229/71 |
| 4,711,347 | 12/1987 | Drexler et al. ............. 206/38 |
| 4,722,376 | 2/1988 | Rhymer .................... 150/147 |
| 4,887,763 | 12/1989 | Sano ........................ 229/71 |
| 5,427,832 | 6/1995 | Longtin .................... 428/40 |
| 5,506,395 | 4/1996 | Eppley ..................... 235/486 |
| 5,511,114 | 4/1996 | Stimson et al. .......... 235/380 X |
| 5,577,109 | 11/1996 | Stimson et al. .......... 235/381 X |
| 5,629,977 | 5/1997 | Fonseca .................... 379/114 |

OTHER PUBLICATIONS

"Retail Realities", *TeleCard World*, Apr. 1996 (six pages).
Front and back of Rand McNally pre-paid phone card package, 1996.
Creative South pre-paid phone card package, 1996.
Sam's Club pre-paid phone card package, 1996.

*Primary Examiner*—Donald T. Hajec
*Assistant Examiner*—Thien Minh Le
*Attorney, Agent, or Firm*—Nixon & Vanderhye P.C.

[57] ABSTRACT

Debit cards, such as long distance telephone cards, may be attractively packaged and even readily mounted for point of purchase display, in such a manner that the card is inactive until activated at the point of purchase. The card may be activated at the point of purchase without the necessity of in any way opening up the attractive packaging, or moving any portion of the packaging out of the way, and by merely "swiping" the card while still mounted in the package through a conventional card reader. The card is mounted between first and second panels of primarily cellulose material including an area significantly greater than that of the card, with the card magnetic strip completely exposed (that is uncovered by the panels or any other packaging material). The majority of the card is typically sandwiched between the first and second panels and is removably held to the panels, for example by hold melt adhesive, and the panels are affixed to each other.

21 Claims, 5 Drawing Sheets

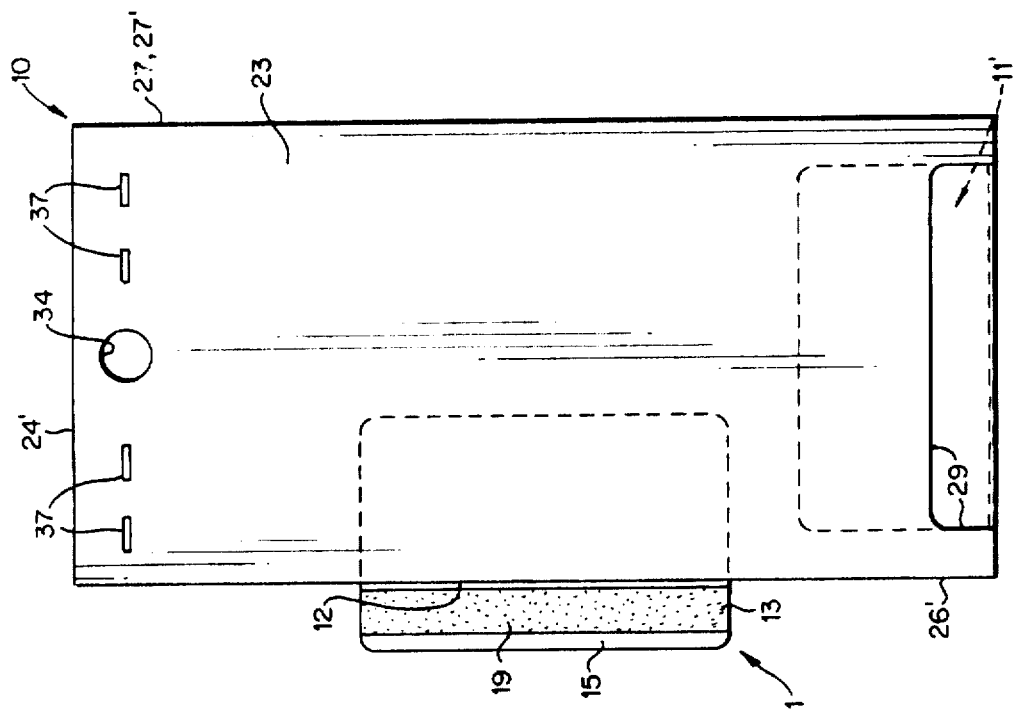
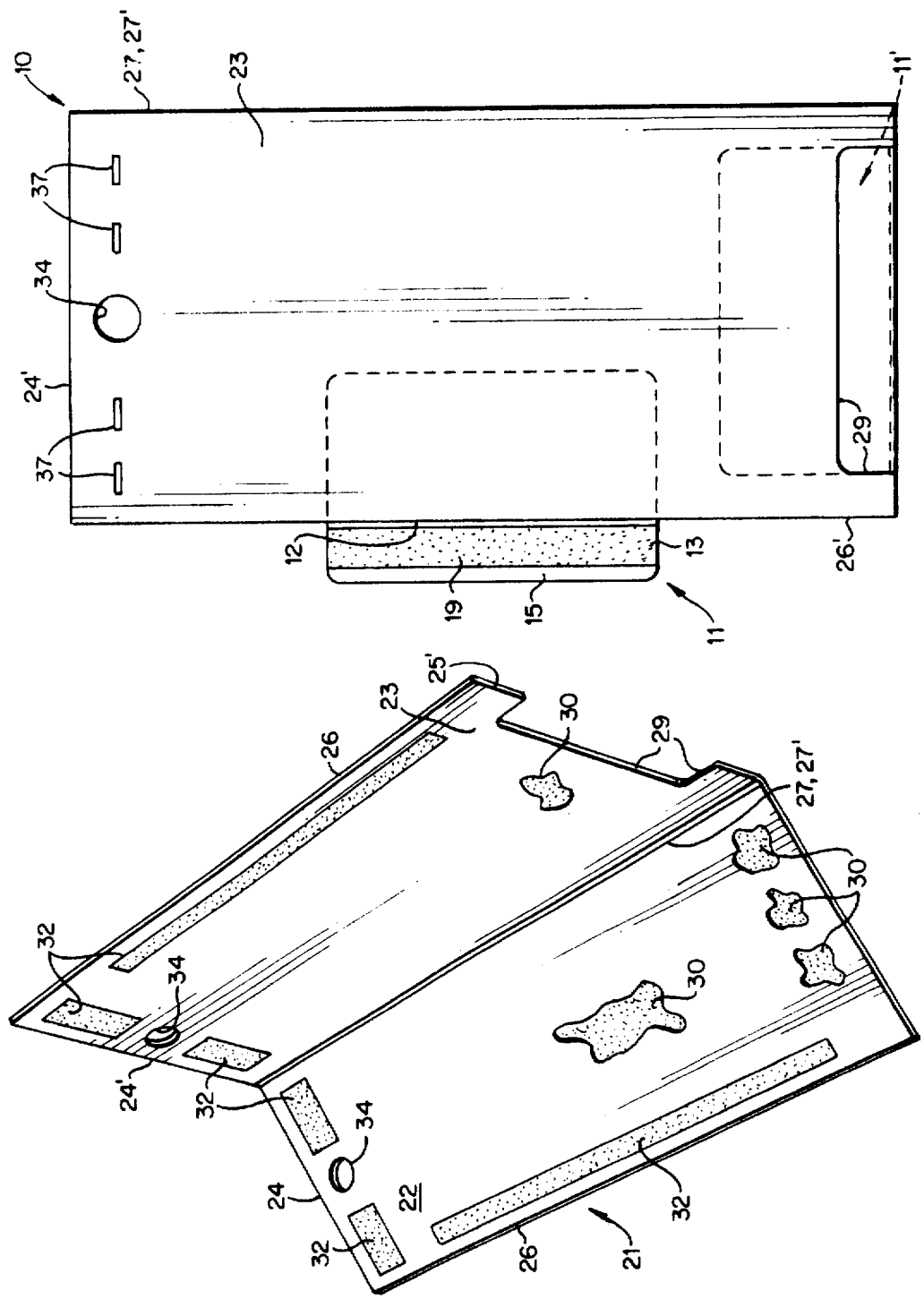

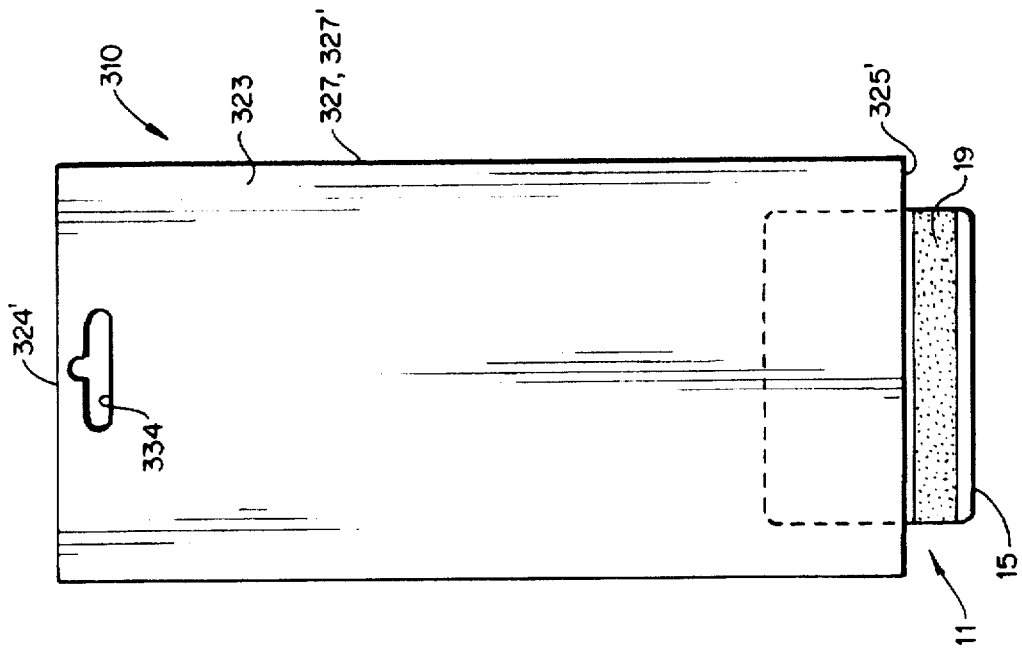
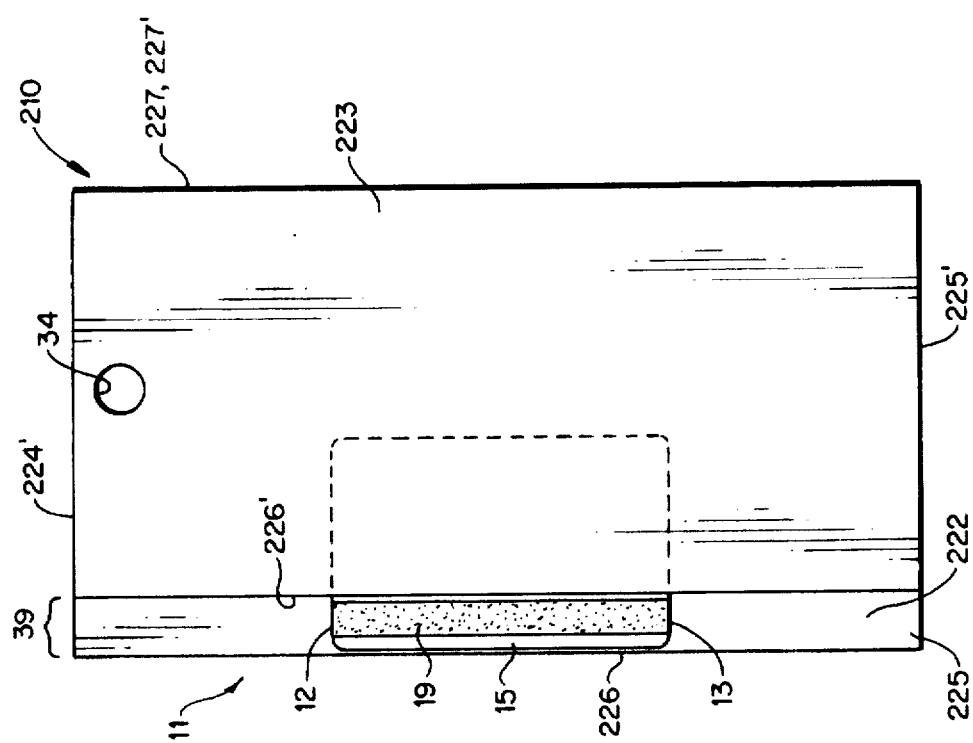

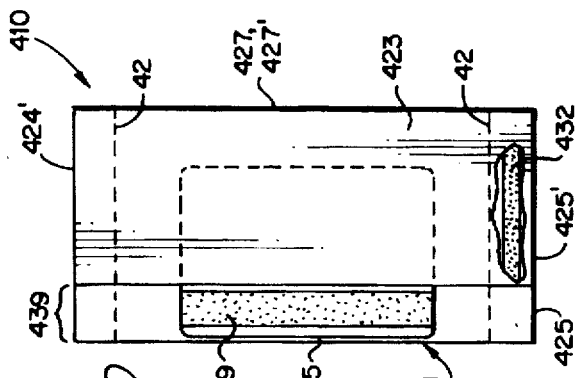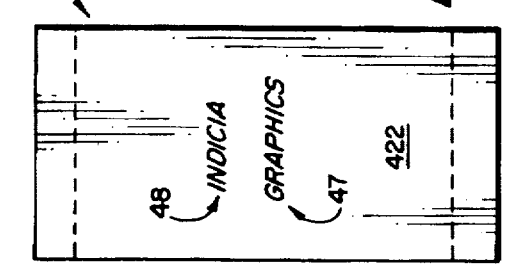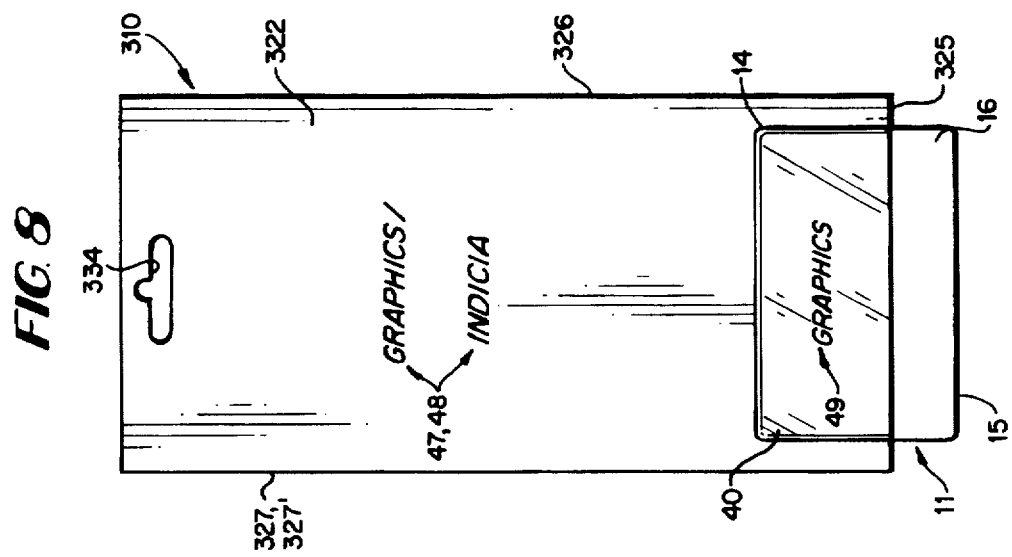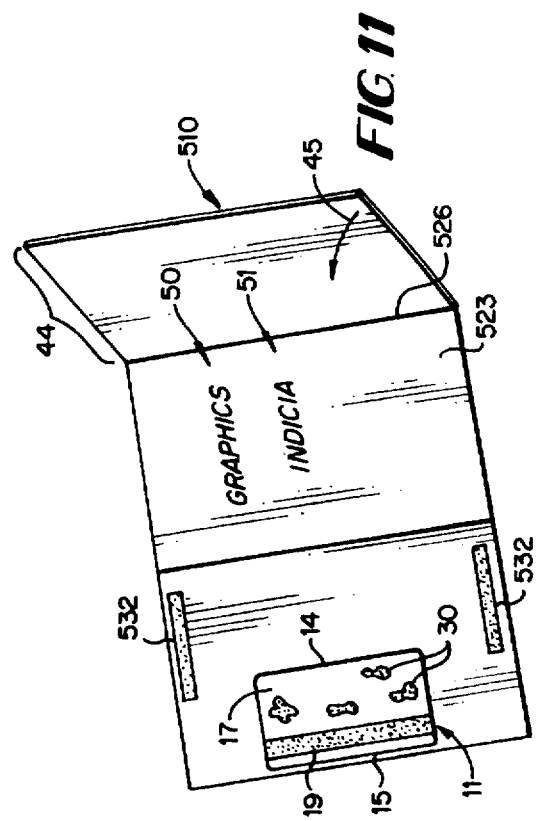

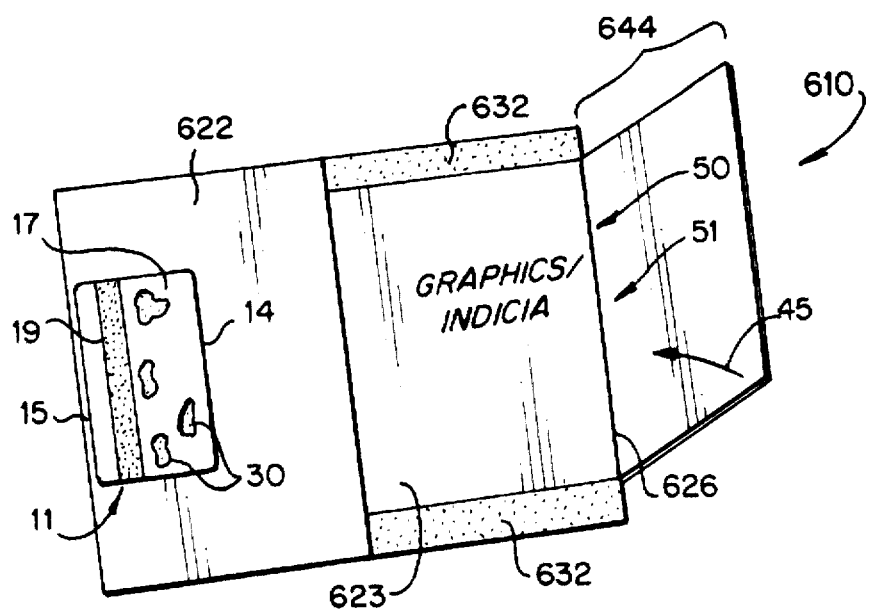
FIG. 12
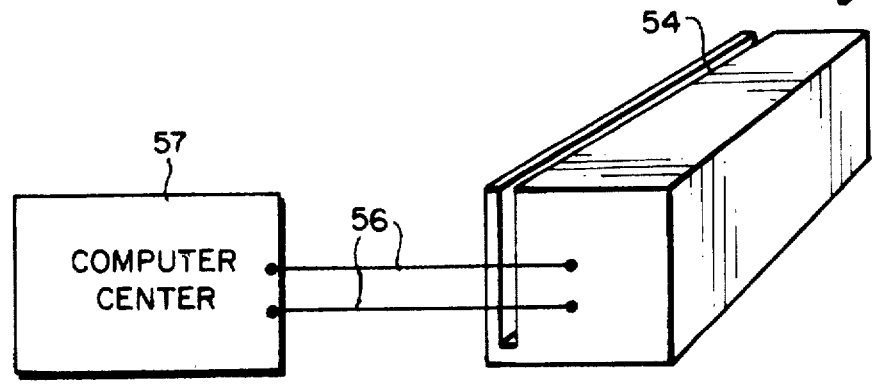
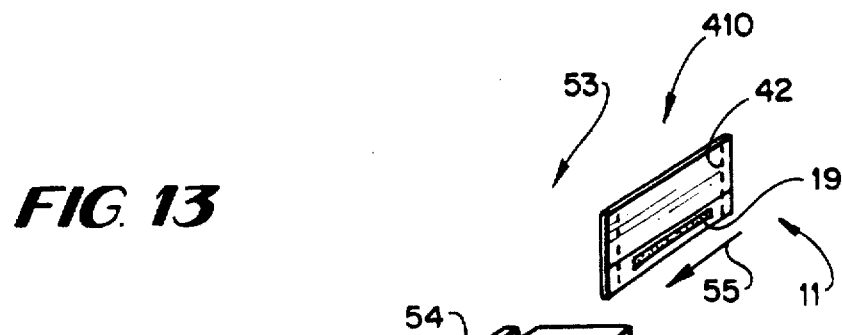
FIG. 13

PREPAID CARD

BACKGROUND AND SUMMARY OF THE INVENTION

Debit cards (typically plastic cards the same size as a conventional credit card but with a magnetic strip having magnetic encoding thereon corresponding to a pre-purchased amount of particular goods or services) are becoming increasingly popular as a form of payment for goods and services. Such cards have advantages both to the purchasers and to those offering the goods and services purchased utilizing the cards, and in some areas of commerce, such as long distance telephone services, debit cards have had exponential growth in the last few years.

There are many circumstances where it is desirable to offer debit cards at retail establishments. If the cards are active at the time that they are offered for sale, then careful track must be kept by the retail establishment of every aspect of handling the cards, and the cards must be kept in a cash drawer or like secure area, to prevent theft since the cards are easily concealed and can be of very high value. Some commercial products have been provided for mounting debit cards with cardboard packaging that is printed with various graphics and indicia. The packaging may make the cards more difficult to steal, and present them in a pleasing manner, however if the cards are "active" while displayed in this matter the retailer still takes a significant risk of high theft loss. For that reason many cards are sold in such a way that they require activation by a retail establishment, such as by a clerk entering a personal identification number (PIN) in an appropriate electronic device, or swiping the card through a card reader connected to a central computer for the company offering the debit card. While a number of workable package assemblies have been provided, most have drawbacks associated therewith, such as requiring opening of a part of the packaging; or at least requiring movement of parts of the packaging, before the retail establishment can gain access to the magnetic strip on the card to effect activation; or do not package the card in an interesting manner.

According to the present invention a debit card is provided in a prepackaged debit card assembly which attractively, effectively, and interestingly packages a debit card for retail sale, including even on display at point of purchase locations. The invention also relates to a method of providing an active debit card at a point of purchase location while effectively and interestingly displaying the card yet minimizing the possibility of theft loss. According to both aspects of the present invention it is unnecessary to remove the card from its packaging to effect activation, or to move any portion of the packaging for the card, yet the card is securely mounted by the packaging and can be relatively easily removed once activated.

According to one aspect of the present invention a prepackaged debit card assembly is provided comprising the following components: A debit card having a rectangular configuration with first and second end edges and first and second side edges, a front and a back, and an area. A magnetic strip provided on the debit card back face adjacent and substantially parallel to the second side edge, the strip inactivate but capable of being activated at the point of purchase. And a mounting envelope for mounting the debit card while the magnetic strip is exposed, the envelope comprising first and second panels, the panels each having an area at least 20% larger (typically at least 200% larger, and for point of purchase display at least 400% larger) than the card area, the majority of the debit card sandwiched between the first and second panels but the magnetic strip being uncovered by either of the panels or any other packaging. The debit card is removably affixed to at least one of the panels.

The card may be affixed to at least one of the panels by any suitable conventional mechanism such as a wide variety of different types of adhesive, tape, mechanical fasteners, or the like. Particularly desirably is hot melt adhesive, with additional adhesive (either hot melt or pressure sensitive or a wide variety of other types of adhesive) provided to also hold the panels tightly in contact with each other. The card is typically a plastic card, such as conventionally used for debit cards and credit cards (and of that same size), while the panels are preferably of at least primarily stiff cellulosic material, such as paperboard, cardboard, or heavy weight paper sheets. Where point of purchase display is to be provided the mounting mechanism is associated with at least one of the panels remote from the card magnetic strip for mounting the panels and debit card at a point of purchase location. For example, the mounting mechanism may comprise a hook-receiving opening, a metal or plastic hook, a strip of tape, or a wide variety of other conventional mechanisms.

The first panel may have a flap portion thereof covering the card adjacent the front face second edge, and hot melt adhesive may hold the first panel flap portion to the card front face. Alternatively, the front face of the card opposite the strip may also be uncovered by either of the first and second panels, and/or the magnetic strip may be disposed at a die cut in the second panel.

The first and second panels may each have a rectangular configuration with first and second opposite and substantially parallel side edges and first and second opposite and substantially parallel end edges, the side edges at least 10% longer than the end edges (and preferably at least 25% longer). The magnetic strip may be parallel to an adjacent second panel first side edge or parallel to and adjacent the second panel second end edge. The first panel end edges may be longer than the second panel end edges, and the first panel first edge substantially aligned with the card second side edge and the card front face affixed to the first panel adjacent the first panel first side edge. Alternatively, all of the side and end edges of the first and second panels may be aligned with and affixed to each other, with a hook-receiving opening formed in the first and second panels adjacent the first end edges thereof.

While it is preferred that a single debit card be mounted, the envelope according to the invention may mount multiple cards. For example, a second identical debit card may be mounted by the envelope with the second card magnetic strip uncovered by the panels or any other packaging. When mounted for point of purchase display the first and second panels are preferably formed by folding in half a paperboard sheet 8½ by 8½ inches to form an envelope 8½ inches by 4¼ inches. The debit card may be up to 30 mil PVC or teslin. Graphics may be provided on the card wherever desired.

The cards and packages may also be made for cash drawer size, e.g., the final panels in the package being approximately 6 inches by 2½ inches. If desired, the envelope may include a third panel, the third panel disposed between the card and the second panel, and typically affixed to the card and the first panel. In this case the envelope area is less than three times the area of the card.

According to another aspect of the present invention a method of providing an active debit card is utilized, the method comprising the following steps: (a) Providing a rectangular configuration card with first and second end edges and first and second side edges, a front and a back and an area, with an inactive but activatable magnetic strip on the card back face adjacent and substantially parallel to the second side edge. (b) Packaging the card between first and second primarily cellulosic panels of an envelope so that the majority of the area of the card is sandwiched between the panels and affixed to at least one of the panels, and so that the magnetic strip is uncovered by either of the panels or any other packaging. (c) Mounting the envelope for display at a point of purchase location. And (d) during or after purchase of the envelope, with card, activating the card so that it may be used as a debit card by passing the card through a magnetic card reader without removing the card from the envelope or moving any portion of the envelope to expose the magnetic strip.

It is a primary object of the present invention to provide an advantageous manner of packaging, and package, for debit cards, such as long distance phone cards. This and other objects of the invention will become clear from an inspection of the detailed description of the invention and from the appended claims.

BRIEF DESCRIPTION OF THE DRAWINGS

FIG. 4 is an inside perspective view of the panel forming the envelope of the assembly of FIGS. 1 and 2 with the panels opened up to show the interior thereof;

FIG. 5 is a rear view of the second embodiment of a packaged debit card assembly according to the present invention;

FIG. 6 is a rear view of a third embodiment of a packaged debit card assembly according to the present invention;

FIG. 7 is a rear view of a fourth embodiment of a packaged debit card assembly according to the present invention;

FIG. 8 is a front view of the embodiment of FIG. 7;

FIG. 9 is a front perspective view of another exemplary embodiment of a prepackaged debit card assembly according to the present invention;

FIG. 10 is a rear perspective view of the assembly of FIG. 9 with a portion thereof cut away for clarity of illustration;

FIGS. 11 and 12 are, respectively, opened up views of two further embodiments of packaged debit card assemblies according to the present invention, showing the interiors of the panels thereof; and FIG. 13 is a top perspective schematic view showing one manner of the activation of a prepackaged debit card assembly according to the present invention, the assembly actually illustrated in FIG. 13 being the assembly of FIGS. 9 and 10.

DETAILED DESCRIPTION OF THE DRAWINGS

Figure 1:
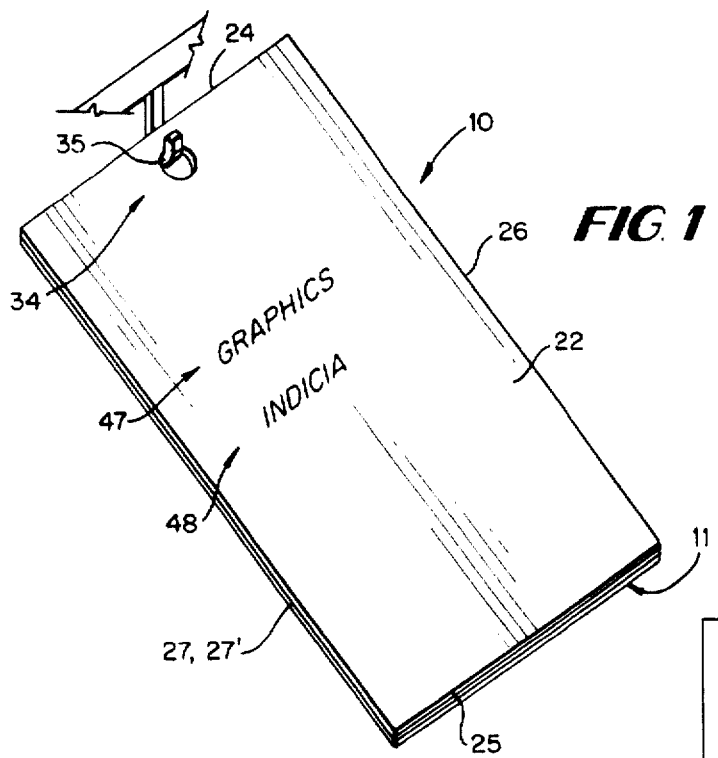
FIG. 1 is a front perspective view of one exemplary form of a packaged debit card assembly according to the claimed invention.
Figure 2:
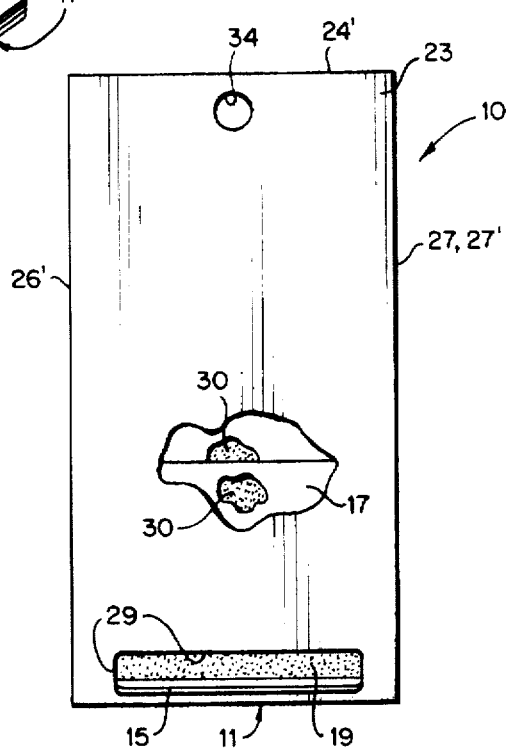
FIG. 2 is a rear view of the assembly of FIG. 1 with portions of the second panel cut away for clarity of illustration.

A first embodiment of a packaged debit card assembly according to the present invention is shown generally by reference numeral 10 in FIGS. 1 and 2. One of the elements of the assembly 10 is the debit card 11, seen most clearly in FIGS. 2 and 3. The debit card 11 is preferably plastic, e.g. 30 mil thickness PVC or teslin, and typically is of conventional construction, e.g. rectangular configuration with first and second end edges 12, 13, first and second side edges 14, 15, a front 16 (FIG. 3), a rear 17 (FIG. 2), and an area (e.g. the area being roughly between 6.5–8 square inches, e.g. the side edges 14, 15 each about 3.3 inches, and the end edges 12, 13 each about 2.2 inches). The debit card 11 also has a magnetic strip 19 on the back face 17 adjacent and substantially parallel to the side edge 15. The strip 19 preferably is inactive but capable of being activated at a point of purchase.

The assembly 10 also comprises a mounting envelope 21 (see FIG. 4 in particular) for mounting the debit card 11 while the magnetic strip 19 is exposed. The envelope 21 comprises a first panel 22 (FIGS. 1 and 4) and a second panel 23 (FIGS. 2 and 4), 2both of which are preferably rectangular in configuration and which may be of the same size or somewhat different sizes as will be hereinafter further explained. Each of the panels has an area at least 20% larger than the card area, and typically at least three times larger than the card 11 area so that the majority of the debit card 11 is sandwiched between the first and second panels but the magnetic strip 19 is uncovered by either the panels 22, 23 or any other packaging.

Each of the panels 22, 23 has first and second end edges 24, 24', 25, 25', respectively, which—in the embodiment of FIGS. 1, 2, 4—are aligned with each other; and first and second side edges 26, 26', 27, 27', respectively. The side edges 26, 26', 27, 27' are at least 10% longer, and typically more than 20% longer, than the end edges 24, 24', 25, 25'. In the embodiment of FIGS. 1, 2 and 4 the side edges 26, 26' and 27, 27' are all of substantially the same length. As seen in FIG. 4, in the particular embodiment illustrated there the side edges 27, 27' are a fold line of a single quadrate sheet of at least primarily cellulose material, such as paperboard, cardboard, stiff bond paper, or the like, folded at a score line or other fold line.

In the assembly 10 the card 11 is affixed to at least one of the panels 22, 23. Card 11 may be affixed by any suitable conventional mechanism, the most desirable of which is the hot melt adhesive illustrated schematically by blobs 30 in FIGS. 2 through 4, because hot melt adhesive securely bonds with the plastic of the card 11 yet may be readily removed from the plastic faces 16, 17 of the card 11. The hot melt adhesive 30 is preferably affixed to both of the insides of the panels 22, 23 and both of the card faces 16, 17, although the adhesive 30 may engage only one face 16, 17. Alternative fixing mechanisms may comprise other types of adhesive, tape, or mechanical fasteners.

In the embodiment illustrated in FIGS. 1, 2, and 4, the second panel 23 includes a die cut 29 which exposes the magnetic strip 19 as illustrated in FIG. 2, the adhesive 30 holding the card 11 in the position illustrated in FIG. 2. The assembly 10 may also comprise other mechanisms for holding the panels 22, 23 together aside from the hot melt adhesive 30. For example, other strips or patterns of adhesive 32 (see FIG. 4) may be provided along various of the edges of one or both of the panels 22, 23, such as pressure sensitive or pressure actuatable adhesive or cohesive; or other types of adhesive, tape, or mechanical fasteners (such as staples or rivets) may be utilized.

When the assembly 10 is to be used for point of purchase there preferably also is provided a mounting mechanism associated with at least one of the panels 22, 23 remote from the strip 19 and mounting the panel 22, 23 and debit card 11 at a point of purchase location. One form that the mounting means may take is the simple opening 34 which is punched otherwise formed in both of the panels 22, 23, and which may receive a conventional hook or tine 35 (see FIG. 1) at a retail establishment or like point of purchase location.

FIGS. 5 through 12 illustrate various other embodiments of assemblies according to the present invention, in each case the card 11 being identically illustrated and therefore indicated by the same reference numeral. In each of these other embodiments components comparable to those in the FIG. 1 embodiment are shown by the same two digit reference numeral only preceded by another number. Structures that are essentially identical are shown by the same reference numeral.

FIG. 5 is a rear view of a second embodiment of the assembly 110 according to the present invention. In this case the only differences between what is illustrated there and the FIGS. 1, 2 and 4 embodiment is the mounting of the debit card 11 so that the majority thereof is sandwiched between the panels 22, 23 with the stripe 19 outwardly of the envelope 21 adjacent and parallel to a side edge 26' of the panel 23. Also, in this embodiment staples 37 are seen which comprise a mechanism for holding the panels 22, 23 together. Also, this embodiment illustrates that the assembly 110 may include a second (or even more) debit card, shown schematically in a dotted line at 11' in FIG. 5. In this case the die cut 29 is provided and the magnetic strip of the card 11' is accessible through the cutout 29. When just the card 11 is mounted in the assembly 110 of FIG. 5 the cutout 29 may be eliminated.

The assembly 210 of FIG. 6 is similar to the assembly 110 of FIG. 5 except that the cutout 29 has been eliminated, and the end edges 224, 225 are longer than the end edges 224' 225' so as to provide the flap 39 which covers up the front face 16 of the card 11 aligned with the strip 19, that portion of the face 16 of the card 11 having been exposed in the FIG. 5 embodiment.

FIGS. 7 and 8 show another assembly 310 according to the invention similar to that illustrated in FIG. 1 only the configuration of the mounting opening 334 is different, and the card 11 extends downwardly from the bottom edges 325, 325' of the panels 322, 323, no cutout like the cutout 29 being provided. That is, the strip 19—as seen in FIG. 7—is adjacent and parallel to the bottom edge 325'. Also, in the embodiment of FIGS. 7 and 8 on the front face of the first panel 322—as seen in FIG. 8—a transparent window 40 may be provided in the otherwise cellulosic material panel 322 so that the entire front face 16 of the card 11 is visible. The transparent panel 40 may be of any suitable transparent material such as cellophane, plastic, or the like. The transparent panel 40 may be heat sealed, glued, affixed by tape, or affixed by mechanical fasteners, preferably to the inside face of the panel 322.

FIGS. 9 through 12 illustrate embodiments of assemblies according to the invention which are of cash drawer size (e.g. the envelopes being approximately 6 inches by approximately 2½ inches) rather than the point of purchase size of the embodiments of FIGS. 1 through 8 (e.g. about 8½ inches by about 4¼ inches). The assembly 410 of FIGS. 9 and 10 is very similar to the assembly 210 of FIG. 6 except that it is devoid of a mounting hole, and less adhesive is necessary because of the smaller components therefore the adhesive 432 (see FIG. 10) may be disposed along merely the edges 424', 425' of the panel 423 to hold the panels 422, 423 together (the hot melt adhesive for holding the card 11 to the panel 422, 423 not seen in FIGS. 9 and 10). Also in this embodiment, then, perforations or other lines of weakness 42 may be provided parallel to the edges 424, 424', 425, 425'. The front face 16 of the card 11 is aligned with the strip 19 and is covered by the panel 439. When the assembly 410 is desirably opened, the envelope is torn along the 25 perforations 42. This then means the panels 422, 423 may be easily separated to expose the card 11.

The assembly 510 is the same as the assembly 410 except that a third panel 44 is provided, which, during construction of the assembly 510, is folded over in the direction of the arrow 45 along the fold line forming the edge interface 526' between the panels 523, 44, the panel 44 coming into face-to-face contact with the panel 522 and engaging the adhesive 532, 30. The embodiment of FIG. 11 will be utilized when the envelope of the assembly 510 is completely opened up, and it is desired to have more area for printing of graphics or indicia.

The assembly embodiment 610 illustrated in FIG. 12 is virtually identical to that in FIG. 11, except that for the assembly 610 the third panel 644 has a length less than the length of the panels 622, 623, and the adhesive 632 thus directly holds the panels 622, 623 together after the third panel 644 has been folded in the direction of the arrow 45 into face-to-face contact with the second panel 623.

Figure 3:
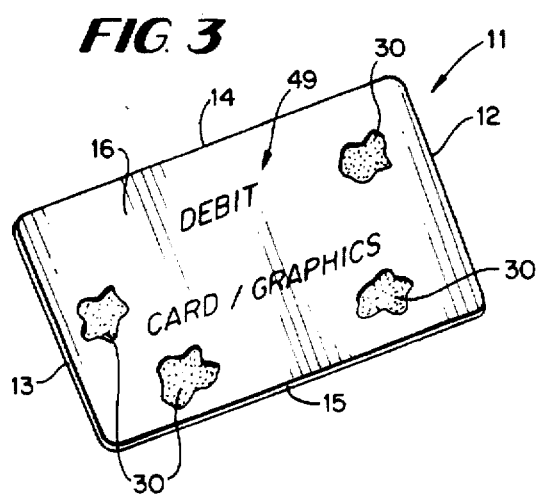
FIG. 3 is a top perspective view of an exemplary debit card according to the present invention.

For all of the assemblies according to the invention it is desirable to provide indicia and graphics at a number of different locations, to make the packaging attractive and to provide the desired information. For example, as illustrated in FIG. 1 the graphics 47 and indicia 48 may be provided on the front face of the first panel 22, while graphics and/or indicia 49 are provided on the front face 16 of the card 11 as illustrated in FIG. 3. Also, the graphics 50 and indicia 51 may be provided on the inside faces of the panels 523, 44 as seen in FIG. 11, and 623, 644 in FIG. 12.

For all embodiments of the assemblies according to the present invention it is desirable that the card 11 not be active until right around the time of sale. Because the magnetic strip 19 is exposed in all embodiments of the invention, and because the packaging associated with the envelope 21 is relatively thin and normally at most only one thickness of cellulosic material is provided on the opposite face of the card 11 from the stripe 19, the card 11 may be activated without removing it from the packaging, or without moving any portion of the packaging. While the card 11 may be activated in a number of different manners, FIG. 13 schematically illustrates one particularly desirable manner. In this embodiment the assembly 410 is illustrated, but it is to be understood that all of the different assemblies of FIGS. 1 through 12 are operated in the same manner.

The assembly 410 is positioned so that the stripe 19 is in association with the reading head of a conventional magnetic card reader 53 having a groove 54 therein through which a card is intended to swiped. The reader 53 is connected by phone lines 56 or the like to computer center 57. When the card 11 is swiped information from strip 19 is transmitted over the phone lines 56 to the computer center 57, which then changes its database to allow the card 11 to be used as a debit card until the predetermined amount of "money" that is magnetically encoded thereon is used up.

Activation of card 11 could also occur using a PIN which is entered by the store clerk or another at the point of purchase. This activates the card 11 when the PIN number (typically associated with swiping of the card 11) is transmitted to a central computer 57. Alternatively, a different (from reader 53) electronic appliance could be utilized for specifically encoding the card 11 at the point of purchase.

It will be seen that in any event the card 11 magnetic strip 19 is easily activated by swiping through the reader 53, or the like, in the direction of arrow 55 without in any way disturbing the packaging for the card 11.

It will thus be seen that according to the present invention a desirable assembly and method have been provided for packaging, displaying and/or activating debit cards. While the invention has been herein shown and described in what is presently conceived to be the most practical and preferred embodiment thereof, it will be apparent to those of ordinary skill in the art that any modifications may be made thereof within the scope of the invention, which scope is to be accorded the broadest interpretation of the appended claims to encompass all equivalent structures and methods.

What is claimed is:

1. A packaged debit card assembly comprising:
    a debit card having a rectangular configuration with first and second end edges and first and second side edges, a front and a back, and an area;
    a magnetic strip provided on said debit card back face adjacent and substantially parallel to said second side edge, said strip inactivate but capable of being activated at the point of purchase;
    a mounting envelope for mounting said debit card while said magnetic strip is exposed, said envelope comprising first and second panels, said panels each having an area at least 20% larger than said card area, the majority of said debit card sandwiched between said first and second panels but said magnetic strip being uncovered by either of said panels or any other packaging; and
    said debit card removably affixed to at least one of said panels.

2. A packaged debit card assembly as recited in claim 1 wherein said card is affixed to at least one of said panels by hot melt glue.

3. A packaged debit card assembly as recited in claim 2 wherein said card is plastic and said panels are of stiff cellulosic material.

4. A packaged debit card assembly as recited in claim 3 further comprising a mounting mechanism associated with at least one of said panels remote from said strip for mounting said panels and debit card at a point of purchase location.

5. A packaged debit card assembly as recited in claim 4 wherein said mounting mechanism comprises a hook-receiving opening.

6. A packaged debit card assembly as recited in claim 2 wherein said first panel has a flap portion thereof covering said card adjacent said front face second edge, and wherein said hot melt adhesive holds said first panel flap portion to said card front face.

7. A packaged debit card assembly as recited in claim 1 wherein said front face of said card opposite said strip is also uncovered by either of said first and second panels.

8. A packaged debit card assembly as recited in claim 1 wherein said magnetic strip is disposed at a die cut in said second panel.

9. A packaged debit card assembly as recited in claim 1 wherein said first and second panels have a rectangular configuration with first and second opposite and substantially parallel side edges and first and second opposite and substantially parallel end edges, said side edges at least 10% longer than said end edges.

10. A packaged debit card assembly as recited in claim 9 wherein said magnetic strip is parallel to and adjacent said second panel first side edge.

11. A packaged debit card assembly as recited in claim 8 wherein said magnetic strip is parallel to and adjacent said second panel second end edge.

12. A packaged debit card assembly as recited in claim 11 wherein said front face of said card opposite said strip is also uncovered by either of said first and second panels.

13. A packaged debit card assembly as recited in claim 10 wherein said front face of said card opposite said strip is also uncovered by either of said first and second panels.

14. A packaged debit card assembly as recited in claim 10 wherein said first panel end edges are longer than said second panel end edges, and wherein said first panel first edge is substantially aligned with said card second side edge and said card front face is affixed to said first panel adjacent said first panel first side edge.

15. A packaged debit card assembly as recited in claim 14 wherein said card is affixed to at least one of said panels by hot melt adhesive.

16. A packaged debit card assembly as recited in claim 11 wherein said card is affixed to at least one of said panels by hot melt adhesive, and wherein said first panel has a flap portion thereof covering said card adjacent said front face second edge, and wherein hot melt adhesive holds said first panel flap portion to said card front face.

17. A packaged debit card assembly as recited in claim 1 further comprising a second debit card mounted by said envelope with said second card magnetic strip uncovered by said panels or any other packaging.

18. A packaged debit card assembly as recited in claim 11 further comprising a hook receiving opening formed in said first and second panels adjacent said first end edges thereof, said first and second panel first end edges and first and second side edges being aligned with and affixed to each other.

19. A packaged debit card assembly as recited in claim 1 further comprising a third panel of said mounting envelope, said third panel disposed between said card and said second panel.

20. A packaged debit card assembly as recited in claim 1 wherein said envelope is cash drawer size, each of said panels having an area less than three times the area of said card.

21. A method of providing an active debit card, comprising the steps of:
    (a) providing a rectangular configuration with first and second end edges and first and second side edges, a front and a back and an area, with an inactive but activatable magnetic strip on said card back face adjacent and substantially parallel to said second side edge;
    (b) packaging the card between first and second primarily cellulosic panels of an envelope so that the majority of the area of the card is sandwiched between the panels and affixed to at least one of the panels, and so that the magnetic strip is uncovered by either of the panels or any other packaging;
    (c) mounting the envelope for display at a point of purchase location; and
    (d) during or after purchase of the envelope, with card, activating the card so that it may be used as a debit card by passing the card through a magnetic card reader without removing the card from the envelope or moving any portion of the envelope to expose the magnetic strip.

* * * * *